United States Patent

[11] 3,578,741

[72] Inventor Armin Blumer
Schwanden, Switzerland
[21] Appl. No. 828,117
[22] Filed May 27, 1969
[45] Patented May 18, 1971
[73] Assignee Maschinenfabrik und Giesserei Netstal AG
Netstal, Switzerland
[32] Priority May 31, 1968
[33] Switzerland
[31] G8198/68

[54] VALVE FOR A PLASTIFYING DEVICE
11 Claims, 2 Drawing Figs.
[52] U.S. Cl. ............................................... 18/30,
18/12
[51] Int. Cl. ................................................. B29f 1/00
[50] Field of Search ............................................ 18/308 (Q),
(SM), (SR), 128 (E); 259/9, 10, 45, 46; 264/329

[56] References Cited
UNITED STATES PATENTS
3,452,398 7/1969 Siegel .......................... 18/30
FOREIGN PATENTS
476,748 5/1929 Germany .................... 18/12(SE)
1,201,039 9/1965 Germany .................... 18/30(SQ)

Primary Examiner—J. Spencer Overholser
Assistant Examiner—Michael O. Sutton
Attorney—McGlew and Tuttle

ABSTRACT: In a plastifying device, a valve member is provided on the leading end of a worm for regulating flow to an injection head. The valve is displaceable in the axial direction of the worm and it has a head portion on its leading end, the axis of which is offset from the axis of the worm so that, as the worm rotates, the head continuously affords a partial closure for the end of the bore containing the worm and effects a mixing action as the material is fed to the injection head.

PATENTED MAY 18 1971 3,578,741

INVENTOR
Armin Blumer by *McGlew & Toren*
ATTORNEYS.

VALVE FOR A PLASTIFYING DEVICE

SUMMARY OF THE INVENTION

The present invention is directed to a plastifying device with a worm feed and a blow back obturator for an injection molding machine for plastics materials and, more particularly, it is directed to a valve member mounted on the leading end of the worm for regulating the flow of the material to an injection head.

In the past it has been known to provide a valve member on the leading end of a worm feed within a plastifying cylinder. In its closed position, the valve cooperates with a first seating surface near the outlet end of the plastifying cylinder to prevent the material passing therethrough from flowing backwardly. In its opened position, the valve releases the material for flow through an injection head and, in addition, it is used as a guide core for the material up to the injection channel of a reduced cross section. Moreover, the valve cooperates with a second seating surface and limits the return path of the material within the plastifying cylinder.

The valve members, known in the past as blow back obturators, have a conical surface located adjacent the leading end of the worm which cooperates with a corresponding conical surface on an inset ring within the plastifying cylinder. Extending axially through the inset ring is a shaft spaced from the worm and the shaft has a coaxial head mounted on its leading end which extends to a conical point and has a number of axially extending parallel edge recesses. A surface on the head is adapted to cooperate with a corresponding end stop face on the inset ring. In this valve member there is the disadvantage that the passage of material afforded by the edge recesses in the head restricts flow because it is divided into several paths which eventually mix or merge together in an inefficient manner. Further, the installation of the valve member is complicated, since it has a larger diameter than that of the inset ring.

It is the primary object of the present invention to overcome, as much as is possible, the disadvantages of the prior art by providing a valve member which affords adequate mixture of the material being fed to the injection head and also overcomes the problems of backflow within the plastifying cylinder.

Therefore, in accordance with the present invention, a valve member is provided extending forwardly from a worm feed and having a head located on its leading end with its axis arranged eccentrically to the axis of the worm. The outside diameter of the head adjacent the inset ring has a diameter less than the inside diameter of the inset ring. As the valve member is rotated with the worm the head affords a closure for only a portion of the annular passage through the inset ring. Moreover, the adjacent circumferential surfaces of the head and the shaft coincide at one point whereby at that point a continuation of the circumferential surfaces of the head is provided on the shaft.

Within the plastifying cylinder, the valve member is axially displaceable between a closed position cutting off the flow of material forwardly from the worm and an opened position in which the material flows through the annular space between the inner surface of the inset ring and the shaft of the valve member. In the opened position the head is seated against a transverse surface on the inset ring and, due to the eccentric or radially offset arrangement of the head, continuous flow is permitted from the annular passageway and the overlapping arrangement of the head across a portion of the passageway guarantees a good mixing action on the material issuing from the plastifying cylinder. Further, the arrangement and dimensions of the head also facilitate the installation of the valve member within the plastifying cylinder.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
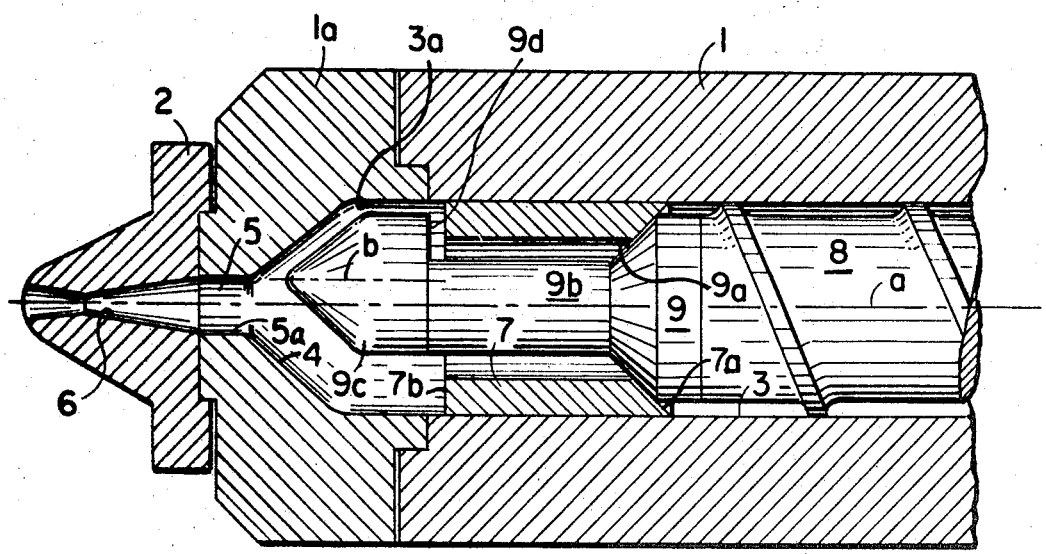
FIG. 1 is a partial side view, partly in section, of a plastifying device illustrating one embodiment of the present invention.

In FIG. 1, the outlet or leading end of a plastifying device is shown formed of a plastifying cylinder 1 having a stop head 1a coaxially mounted at its outlet end. For purposes of describing the structure and operation of the present invention the end of the plastifying cylinder having the stop head 1a will be referred to as the leading end, that is, the left-hand end as viewed in FIG. 1 and the opposite or right-hand end will be referred to as the trailing end or section.

At the outlet end of the plastifying device, an injection head 2 is mounted in coaxial arrangement on the stop head 1a and is attached in a manner well known in the art. The bore 3 of the cylinder 1 extends into the stop head 1a providing a bore continuation 3a having the same diameter as within the cylinder. Intermediate the axial length of the stop head 1a the bore tapers from continuation 3a through a frustoconical portion 4 to a cylindrically shaped outlet portion 5a at its leading end. The outlet passageway 5 from the stop head leads into an injection channel 6 within the injection head 2.

Fitted within the leading end of the bore 3 of the plastifying cylinder 1 is an inset sleeve 7 whose outer surface contacts the inner surface of the bore 3 and the opening through the sleeve affords a continuation of the bore 3 leading into the bore continuation 3a within the stop head 1a. At its trailing end the inset sleeve 7 has a frustoconically shaped surface 7a tapering inwardly toward the outlet end of the cylinder 1. At the opposite or leading end of the inset sleeve 7, it has an annular surface 7b disposed in a plane perpendicular to the axis a of the cylinder 1.

A plastifying worm 8 is positioned within the cylinder 1 rearwardly from the inset sleeve and is arranged therein in a known manner. From the leading end of the worm 8, a valve member 9 extends forwardly into the stop head 1a passing through the bore or passageway provided by the inset sleeve 7. Adjacent its connection to the worm 8, the valve 9 has a frustoconical surface 9a facing toward the leading end of the plastifying device and tapering inwardly from a diameter corresponding to the core diameter of the worm to a diameter somewhat smaller than the inside diameter of the inset sleeve 7. The angle of the surface 9a corresponds to that of the seat or inlet surface 7a at the trailing end of the inset sleeve 7. A shaft 9b, coaxial with the worm or cylinder, extends from the smaller diameter end of the surface 9a through the inset sleeve 7 to the stop head 1a end of the cylinder 1. Since the shaft 9b has a smaller diameter than the inset sleeve and is arranged coaxially within the cylinder 1, a concentric annular passageway is provided about the shaft through the inset sleeve. Mounted on the leading end of the shaft 9b is a valve head 9c which extends forwardly into the stop head 12. The head 9c is symmetrically arranged about its axis b which is eccentric to or radially offset from the axis a of the cylinder and worm. At its end connected to the shaft the head is formed by a cylindrically shaped section which projects forwardly into the stop head 1a and extending axially from the cylindrical section is a conical section and the angle of cone corresponds to the angle of the oppositely disposed frustoconical surface 4 within the stop head 1a. As indicated in FIG. 1, the conical surface on the head 9c is spaced inwardly from the opposed surface 4 of the stop head.

In addition to the eccentric arrangement of the axis $b$ of the head 9c relative to the axis $a$ of the worm and the shaft, the diameter of the cylindrical section of the head is somewhat smaller than the inside diameter of the inset sleeve 7. In addition, the relationship of the eccentricity of the axes $a,b$ and the relative diametrical dimensions of the interior of the inset sleeve and of the cylindrical section of the head are arranged so that the circumferential surfaces of the shaft and the cylindrical section of the head coincide at one point and at this location afford a continuous line from the circumferential surface of the shaft 9b to the circumferential surface of the cylindrical section of the head 9c. In FIG. 1, this characteristic of the circumferential surfaces can be noted by the continuous line formed by the shaft and the head on the lower side of the axis $a$.

At its trailing end, the head 9c has a transverse surface 9d extending perpendicularly to the axis of the shaft and extending from the shaft outwardly beyond the inner surface of the inset sleeve 7. The valve member 9 is axially displaceable through the inset sleeve and, in a closed position, as shown in FIG. 1, its frustoconical surface 9a contacts the correspondingly shaped surface 7a on the inset sleeve while in its opened position the frustoconical surfaces 7a and 9a are spaced apart and the surface 9d rests against a portion of the surface 7b at the leading end of the inset sleeve. Accordingly, in the opened position, as the worm and valve member rotate, the surface 9d of the eccentrically arranged head 9c traces a path about the annular surface 7b of the inset sleeve 7. Accordingly, an orifice is provided from the annular passageway between the inner surface of the sleeve and the shaft which has a crescent or sickle-shaped section for admitting the material passing through the plastifying cylinder into the bore continuation 3a in the stop head 1a. As the valve member 9 rotates the orifice from the annular passageway moves about the outlet end of the sleeve so that the injection molding material undergoes a thorough mixing as it enters the stop head 1a. Moreover, the offset arrangement of the head 9c within the stop head 1a and the variable spacing between the surface 4 of the stop head and the oppositely disposed surface of the valve head also effects improved mixing.

Figure 2:
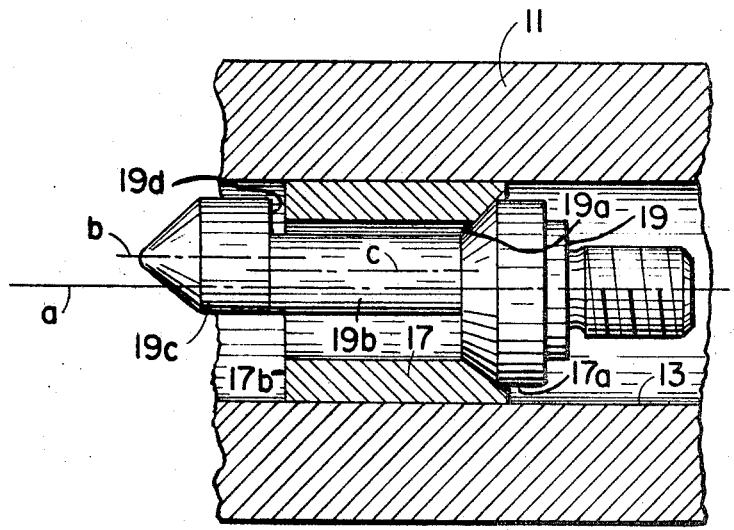
FIG. 2 is another view, similar to FIG. 1, of a plastifying device illustrating a second embodiment of the present invention.

In FIG. 2, an embodiment generally similar to the plastifying device shown in FIG. 1, is exhibited, however, the axial relationship of the head and shaft of the valve member relative to the axis of the worm are different. In FIG. 2, a portion of a plastifying cylinder 11 is shown containing an inset sleeve 17 adjacent its leading end with a valve member 19 extending through the inset sleeve in a manner generally similar to that shown in FIG. 1. At the trailing end the inset sleeve has a frustoconical surface 17a which cooperates with a corresponding frustoconical surface 19a on the end of the valve member 19 adjacent the worm, not shown. The axis of the trailing end of the valve member 19 is coaxial with the axis $a$ of the bore 13 through the cylinder 11. At the leading end of the inset sleeve, an annular surface 17b is provided arranged in a plane perpendicular to the axis $a$ of the bore 13. The valve head 19c has a configuration similar to that shown in FIG. 1, that is, a cylindrical section extending from the shaft 19b with a conical section mounted on the cylindrical section. The trailing surface 19d of the cylindrical section of the head 19c is arranged in a plane perpendicular to the axis $a$ of the bore 13 and is in parallel relationship with corresponding surface 17b of the inset sleeve. The valve member is axially displaceable through the inset sleeve from a closed position with the frustoconically shaped surfaces 17a, 19a in contact to an opened position with the surface 19d of the valve head resting against the surface 17b of the inset sleeve.

In FIG. 1, the axis of the shaft 9b of the valve member coincides with the axis of the worm 8, however, in the embodiment shown in FIG. 2, the axis $c$ of the shaft 19b is offset from the axis $a$ of the worm and the axis $b$ of the head 19c is offset not only with respect to the axis $a$ but also with respect to the axis $c$ of the shaft. All three of the axes $a$, $b$, and $c$ lie in a common plane with the axis $b$ being located radially outwardly from the axis $a$ beyond the axis $c$. As with the embodiment set forth in FIG. 1, the relationship of the diameter of the cylindrical section of the head 19c and the diameter of the shaft 14b is arranged so that at one point their circumferential peripheries coincide and a continuous line is provided from the circumferential surface of the cylindrical section of the head 19c to the circumferential surface of the shaft 17b. Further, the diameter of the cylindrical section of the head is slightly less than the inside diameter of the inset sleeve to facilitate its installation within the plastifying device.

Due to the dual eccentricity of the shaft and head of the valve member 19 with respect to the axis $a$ of the worm, the injection material flowing through the cylinder 11 is mixed both on its passage from the annular passageway between the inset sleeve and the shaft and within the annular passageway since the spacing between the shaft and the inner surface of the inset sleeve is continuously changing as the valve member rotates.

In the embodiments disclosed above a more effective mixing is obtained than was possible in the past with the use of slots or screwlike passages on the head of the valve member. Further, since the diameter of the cylindrical section of the head is slightly less than the inside diameter of the inset sleeve and because of the eccentric arrangement of the head, the manufacture and assembly of the valve member is facilitated and the valve member is capable of acting effectively as a blow back obturator.

I claim:

1. In a plastifying device, for an injection molding machine, comprising a plastifying cylinder having an axially extending bore therethrough, said cylinder having a leading end and a trailing end, an inset ring coaxially fitted within the bore of said cylinder adjacent the leading end thereof and said inset sleeve forming an axially aligned passageway providing a continuation of the bore within said cylinder, a worm member rotatably mounted within the bore in said cylinder and positioned rearwardly of said inset sleeve, and wherein the improvement comprises a valve member attached to the leading end of said worm, said valve member comprising a shaft extending through said inset sleeve from the trailing end to the leading end thereof, said shaft being spaced inwardly from the surface of the passageway through said inset sleeve and forming therewith an annular flow path, a head affixed to the leading end of said shaft and being positioned forwardly of the leading end of said inset sleeve, the axis of said head being in parallel relationship with and arranged eccentrically to the axis of the bore through said cylinder and the trailing end of said head having a dimension transverse to the axis of the passageway through said inset sleeve so that a portion of the outer periphery of said head extends radially outward from the inner surface of said inset sleeve and another portion of the outer periphery of said head is spaced radially inwardly from the inner surface of said inset sleeve whereby with the trailing end of said head and the leading end of said inset sleeve in contact a portion of the annular flow path between said shaft and the inner surface of said inset sleeve is open as the valve member rotates on the end of said worm so that a continuous mixing action is obtained as the materials flow upwardly from the leading end of said inset sleeve about said head.

2. A plastifying device, as set forth in claim 1, wherein said head of said valve member being secured to said shaft so that the circumferential periphery of said head adjacent said shaft coincides with a point on the circumferential periphery of said shaft whereby a continuous line on the circumferential periphery of said shaft arranged in parallel relationship with the axis of the bore extends through the point of coincidence and continues on the circumferential surface of said head.

3. A plastifying device, as set forth in claim 2, wherein the trailing end of said head having a cylindrical form and having a diameter which is less than the inside diameter of said inset sleeve.

4. A plastifying device, as set forth in claim 3, wherein said shaft being coaxially arranged within said cylinder.

5. A plastifying device, as set forth in claim 3, wherein the axis of said shaft being arranged eccentrically to the axis of said cylinder and the axis of said head being arranged eccentrically to the axis of both said cylinder and said shaft, with the axes of said head, said shaft and said cylinder being arranged in a common plane and the axis of said shaft being positioned between the axes of said cylinder and said head.

6. A plastifying device, as set forth in claim 3, wherein said inset sleeve having a frustoconically shaped surface at its trailing end extending transversely to the axis of said cylinder and having an annular surface at its leading end disposed in a plane arranged perpendicularly to the axis of said cylinder.

7. A plastifying device, as set forth in claim 6, wherein said head having a trailing surface disposed transversely to the axis of said cylinder and being in parallel relationship with the leading end annular surface of said inset sleeve.

8. In a plastifying device, as set forth in claim 6, wherein said valve member comprising a transition section extending from the trailing end of said shaft to said worm, said transition section having a frustoconically shaped surface diverging inwardly from the diameter of said worm, and said frustoconical surface having a cone angle corresponding to the cone angle of the frustoconical surface on the trailing end of said inset sleeve, whereby the corresponding said frustoconical surfaces can be placed in contact forming a closure for the bore through said cylinder at the trailing end of said inset sleeve.

9. In a plastifying device, as set forth in claim 3, wherein said head having a cylindrically shaped section extending forwardly from said shaft, and a conically shaped section extending forwardly from said cylindrically shaped section.

10. In a plastifying device, as set forth in claim 9, wherein a stop head being affixed to the leading end of said cylinder and having a bore therethrough forming a continuation of the bore through said cylinder, an injection head fitted to the leading end of said stop head and being coaxial with said stop head and said cylinder, and said injection head providing a passageway forming a continuation of the bores through said stop head and cylinder.

11. In a plastifying device, as set forth in claim 10, wherein the bore within said stop head having a first section having the same diameter as the bore at the end of said cylinder and a second section extending forwardly therefrom having a frustoconical shape surface, the conically shaped surface of said head of said valve member being disposed within the bore in said stop head and having its conical surface disposed in variably spaced relationship relative to the frustoconically shaped surface in the bore of said stop head.